(12) United States Patent
Fujikawa et al.

(10) Patent No.: US 8,395,745 B2
(45) Date of Patent: Mar. 12, 2013

(54) SEMICONDUCTOR DEVICE

(75) Inventors: Saishi Fujikawa, Kanagawa (JP); Kunio Hosoya, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 13/421,933

(22) Filed: Mar. 16, 2012

(65) Prior Publication Data

US 2012/0176559 A1 Jul. 12, 2012

Related U.S. Application Data

(63) Continuation of application No. 11/902,554, filed on Sep. 24, 2007, now Pat. No. 8,144,301.

(30) Foreign Application Priority Data

Sep. 29, 2006 (JP) ................................. 2006-266287

(51) Int. Cl.
*G02F 1/1339* (2006.01)
(52) U.S. Cl. ...................................... 349/156
(58) Field of Classification Search .................. 349/156
See application file for complete search history.

(56) References Cited

U.S. PATENT DOCUMENTS

| | | | |
|---|---|---|---|
| 5,289,300 A * | 2/1994 | Yamazaki et al. | ............... 349/42 |
| 6,097,467 A | 8/2000 | Fujimaki et al. | |
| 6,175,395 B1 | 1/2001 | Yamazaki et al. | |
| 6,587,169 B1 | 7/2003 | Yamazaki et al. | |
| 6,638,781 B1 | 10/2003 | Hirakata et al. | |
| 6,900,855 B1 | 5/2005 | Yamazaki et al. | |
| 7,173,281 B2 | 2/2007 | Hirakata et al. | |
| 7,385,666 B2 | 6/2008 | Ashizawa et al. | |
| 7,605,902 B2 | 10/2009 | Hirakata et al. | |
| 7,773,189 B2 | 8/2010 | Ashizawa et al. | |
| 7,808,009 B2 | 10/2010 | Hirakata et al. | |
| 7,872,725 B2 | 1/2011 | Ashizawa et al. | |
| 8,059,252 B2 | 11/2011 | Misaki et al. | |
| 2002/0094613 A1* | 7/2002 | Yamazaki et al. | ............. 438/151 |
| 2004/0105056 A1* | 6/2004 | Iida et al. | ...................... 349/113 |

(Continued)

FOREIGN PATENT DOCUMENTS

| | | |
|---|---|---|
| JP | 10 048636 | 2/1998 |
| JP | 2001-075500 | 3/2001 |

(Continued)

OTHER PUBLICATIONS

International Search Report(Application No. PCT/JP2007/068737; PCT9987) dated Nov. 6, 2007.

(Continued)

*Primary Examiner* — Uyen Chau N Le
*Assistant Examiner* — Hoang Tran
(74) *Attorney, Agent, or Firm* — Nixon Peabody LLP; Jeffrey L. Costellia (57) ABSTRACT

When a columnar spacer is provided in a region overlapping with a TFT, there is a concern that pressure will be applied when attaching a pair of substrates to each other, which may result in the TFT being adversely affected and a crack forming. A dummy layer is formed of an inorganic material below a columnar spacer which is formed in a position overlapping with the TFT. The dummy layer is located in the position overlapping with the TFT, so that pressure applied to the TFT in a step of attaching the pair of substrates is distributed and relieved. The dummy layer is preferably formed of the same material as a pixel electrode so that it is formed without an increase in the number of processing steps.

9 Claims, 9 Drawing Sheets

U.S. PATENT DOCUMENTS

| | | |
|---|---|---|
| 2005/0206797 A1 | 9/2005 | Yamazaki et al. |
| 2006/0151791 A1 | 7/2006 | Hirakata et al. |
| 2009/0322698 A1 | 12/2009 | Hirakata et al. |
| 2011/0080537 A1 | 4/2011 | Ashizawa et al. |

FOREIGN PATENT DOCUMENTS

| | | |
|---|---|---|
| JP | 2002-189217 | 7/2002 |
| JP | 2002-221727 | 8/2002 |
| JP | 2004-177848 | 6/2004 |
| JP | 2004-180259 | 6/2004 |
| JP | 2005-128357 | 5/2005 |
| JP | 2005-136679 | 5/2005 |
| JP | 2005-250036 | 9/2005 |
| JP | 2006-330470 | 12/2006 |

OTHER PUBLICATIONS

Written Opinion (Application No. PCT/JP2007/068737; PCT9987) dated Nov. 6, 2007.

* cited by examiner

SEMICONDUCTOR DEVICE

TECHNICAL FIELD

The present invention relates to a semiconductor device which has a circuit including thin film transistors (hereinafter, referred to as TFTs), and a manufacturing method thereof. For example, the present invention relates to an electro-optical device typified by a liquid crystal display panel, and to an electronic appliance which has a light emitting display device including an organic light emitting element as a part thereof.

Note that a semiconductor device refers to any device which can function by utilizing semiconductor characteristics. Electro-optical devices, semiconductor circuits, and electronic appliances are all semiconductor devices.

BACKGROUND ART

In recent years, attention has focused on a technique for making a thin film transistor (TFT) by using a semiconductor thin film (having a thickness of approximately several to several hundreds of nanometers) formed over a substrate having an insulating surface. The thin film transistors are widely applied to electronic devices such as ICs and electro-optical devices, and in particular their rapid development as switching elements for image display devices is desired.

A liquid crystal display device is known as an example of an image display device. Compared to passive matrix liquid crystal display devices, high-definition images can be obtained with active matrix liquid crystal display devices; therefore, active matrix liquid crystal display devices have become widely used. In an active matrix liquid crystal display device, when pixel electrodes arranged in matrix are driven, a display pattern is displayed on a screen. In more detail, when voltage is applied between a selected pixel electrode and a counter electrode that corresponds to the selected pixel electrode, a liquid crystal layer provided between the pixel electrode and the counter electrode is optically modulated, and this optical modulation is recognized as a display pattern by an observer.

In a common transmissive-type liquid crystal display device, a liquid crystal layer is provided between a pair of substrates, a first polarizing plate is provided on an outer surface side of one of the pair of substrates which is a first substrate (a substrate provided with a pixel electrode), which is not a side in contact with the liquid crystal layer, and a second polarizing plate is provided on an outer surface side of the other one of the pair of substrates which is a second substrate (a counter substrate), which is not the side in contact with the liquid crystal layer.

When a color filter is used for displaying full color, the color filter is generally provided on a surface which is not the surface of the substrate where the polarizing plate is provided (the counter substrate). In other words, the color filter is generally provided between the counter substrate and the liquid crystal layer.

A spacer for maintaining the gap between the substrates is provided between the pair of substrates, and a particulate bead spacer or a columnar spacer is provided. In the case where a columnar spacer formed of a transparent resin is provided on the counter substrate, there has been a concern about a TFT overlapping with the columnar spacer breaking due to pressure from when the substrate is attached to the other substrate. Accordingly, the degree of precision of attachment of the pair of substrates affects the yield.

The applicant has disclosed a technique of forming a columnar spacer over a substrate on which a TFT serving as a switching element of a pixel portion is formed, in Patent Document 1 (Japanese Published Patent Application No. 2001-75500). In addition, the applicant has disclosed a technique of forming a black matrix formed of an organic resin over a TFT in Patent Document 2 (Japanese Published Patent Application No. H9-105953).

DISCLOSURE OF INVENTION

In resent years, higher definition of a displayed image of a liquid crystal display device has been desired. As definition of a liquid crystal display device is improved, higher aperture ratio is required.

In the case of forming a columnar spacer over a substrate on which a TFT is formed, it is preferable that the columnar spacer be provided in a region overlapping with the TFT, in order to realize high aperture ratio while maintaining sufficient area for a pixel electrode. When the columnar spacer is provided in the region overlapping with the TFT, positions of the pixel electrode and the columnar spacer can be separated.

However, when the columnar spacer is provided in the region overlapping with the TFT, there is a concern that pressure will be applied when attaching the pair of substrates to each other, which may result in the TFT being adversely affected and a crack forming.

The present invention provides a liquid crystal display device with high definition and high aperture ratio. In addition, the present invention provides a liquid crystal display device which can realize a high display quality under outdoor light without an increase in the number of processing steps.

In an active matrix liquid crystal display device, a dummy layer is formed of an inorganic material below a columnar spacer which is formed in a position overlapping with a TFT. The dummy layer is provided in the position overlapping the TFT, so that pressure applied to the TFT in a step of attaching the pair of substrates is distributed to be relieved. The dummy layer is preferably formed of the same material as a pixel electrode in order to be formed without an increase in the number of processing steps.

The dummy layer is provided on either one of the pair of substrates, that is, an element substrate or a counter substrate. The dummy layer distributes and relieves pressure applied to the TFT in a step of attaching the pair of substrates.

A structure of the invention disclosed in this specification is a semiconductor device which includes a first substrate having an insulating surface; a switching element over the first substrate; a pixel electrode electrically connected to the switching element, a dummy layer overlapping with the switching element, over the first substrate; a second substrate provided with a columnar spacer which is overlapping with the dummy layer; and a liquid crystal material between the first substrate and the second substrate. Further, the pixel electrode and the dummy layer are formed of the same material.

The columnar spacer is provided on the counter substrate and the dummy layer is provided over the element substrate, so that pressure applied to the TFT can be distributed and relieved, even when pressure is applied in attachment of the pair of substrates.

Further, the columnar spacer may be formed over the element substrate. Another aspect of the present invention is a semiconductor device which includes a substrate having an insulating surface; a switching element over the substrate; a pixel electrode electrically connected to the switching element; a dummy layer overlapping with the switching element, over the substrate; and a columnar spacer which covers the dummy layer, over the substrate. Further, the pixel electrode and the dummy layer are formed of the same material.

The shape of the dummy layer and the number of dummy layers are not specifically limited as long as the dummy layer can distribute and relieve the pressure. A plurality of dummy layers or a dummy layer with a complex shape such as an S-shape, an M-shape, or a cross-shape may be provided.

When the columnar spacer is formed over the substrate on which the TFT is formed, that is, the element substrate, the columnar spacer is formed using a photolithography technique; therefore, the columnar spacer may be misaligned from a predetermined position depending on the mask alignment accuracy. The distance between the region adjacent to the position overlapping with the TFT and a next switching element is large compared to the one between another region and the switching element. Therefore, when the columnar spacer is formed in a position overlapping with the TFT, even if the columnar spacer is misaligned from the predetermined position, the columnar spacer and a pair of the pixel electrode do not overlap with each other, so that aperture ratio can be prevented from decreasing. In other words, in the present invention, the columnar spacer is provided in the position which does not overlap with the pixel electrode but overlaps with the 111.

In the case of forming the columnar spacer over the element substrate, the columnar spacer is preferably has a trapezoidal cross-sectional shape in order to further distribute pressure. It is preferable that the columnar spacer have a cross-sectional shape with the legs outer than the dummy layer. In addition, the columnar spacer preferably has a frustum shape so that the area of its top surface which is in contact with the counter substrate side is larger than that of its bottom surface which is on the TFT side. More preferably, the total area of top surfaces of the plurality of dummy layers is set to be larger than the area of the top surface of the columnar spacer. In addition, the columnar spacer has a top edge portion with curvature.

Further, a plurality of dummy layers are preferably provided so as to overlap with one columnar spacer in order to improve adhesion of the columnar spacer. Since flatness is important especially in a liquid crystal display device, a planarizing resin film is formed to cover unevenness formed by a TFT in many cases. However, when the columnar spacer is formed on a flat surface, that is, on the planarizing resin film, adhesive strength is low and the adhesion easily decreases. Even in the case of using the planarizing resin film, when a plurality of dummy layers are formed in a region where the columnar spacer is formed, unevenness is formed partially; accordingly, the adhesion of the columnar spacer can be improved. In addition, when the planarizing resin film is provided between the TFT and the dummy layer, pressure is further distributed, which is preferable.

A portion in which the TFT is formed has more layers than other portions and the total thickness of layers tends to be large. When the columnar spacer is formed in a position overlapping with the TFT, the gap between the substrates is easily adjusted. When the columnar spacer is formed in the position overlapping with the TFT, the columnar spacer is provided in a region of a thinnest part of the liquid crystal layer; accordingly, the columnar spacer can be shorter. The shorter columnar spacer is advantageous in the case where the liquid crystal layer needs to be controlled to be thin because the gap between the substrates can be smaller.

The operation mode of the liquid crystal layer is not particularly limited and a twist nematic (TN) mode, a vertical alignment (VA) mode, an in plane switching (IPS) mode, or the like can be employed.

When an IPS mode is employed, the common electrode can be formed using the same material as the dummy layer. Another structure of the present invention is a semiconductor device which includes a first substrate having an insulating surface; a switching element over the first substrate; a pixel electrode electrically connected to the switching element; a common electrode over the first substrate; a dummy layer overlapping with the switching element, over the first substrate; a second substrate with a columnar spacer which is overlapping with the dummy layer, and a liquid crystal layer including a liquid crystal material, between the first substrate and the second substrate. Further, the pixel electrode, the common electrode, and the dummy layer are formed of the same material.

Further, the columnar spacer may be formed over the dummy layer. Another structure of the present invention is a semiconductor device which includes a first substrate having an insulating surface; a switching element over the first substrate; a pixel electrode electrically connected to the switching element; a common electrode over the first substrate; a dummy layer overlapping with the switching element, over the first substrate; a columnar spacer which overlaps with the dummy layer, over the first substrate; a second substrate facing the first substrate; and a liquid crystal layer including a liquid crystal material, between the first substrate and the second substrate. Further, the pixel electrode, the common electrode, and the dummy layer are formed of the same material.

The present invention solves at least one of the foregoing problems.

The foregoing means are not just design requirements. The inventors invented the means as a result of careful examination after forming a columnar spacer and a dummy layer in a display portion, forming a display device using them, and displaying images using the display device.

The dummy layer can be formed in a position overlapping with the TFT and the columnar spacer can be formed in a position overlapping with the TFT without an increase in the number of processing steps. A plurality of dummy layers or a dummy layer with a complex shape can be provided to improve adhesion of the columnar spacer.

BEST MODE FOR CARRYING OUT THE INVENTION

Embodiment modes of the present invention are described below.

(Embodiment Mode 1)

Figure 1A:
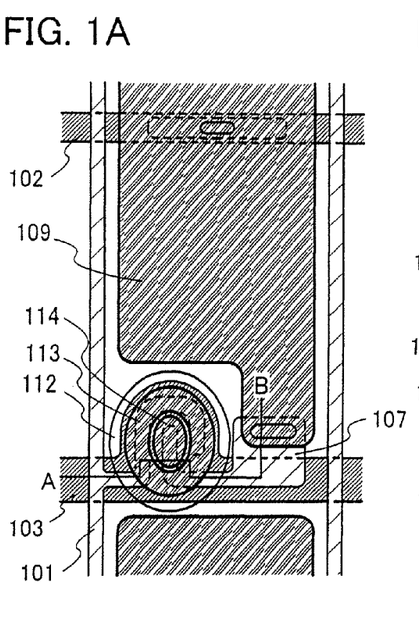
FIGS. 1A to 1C are top views and a cross-sectional view illustrating a pixel structure.

FIG. 1A shows a top view of one pixel included in a pixel portion in an active matrix liquid crystal display device. FIG. 1C shows a cross-sectional view taken along the line A-B in FIG. 1A.

An active element is provided close to an intersection of a source wiring 101 and a gate wiring 103. Here, a TFT is used as the active element. The TFT is electrically connected to a pixel electrode 109 and serves as a switching element. The TFT is controlled to be On or Off with voltage applied to the gate wiring 103, and orientation of a liquid crystal layer in the vicinity of the pixel electrode 109 is controlled, thus the liquid crystal display device is driven. In the present invention, a first dummy layer 113, a second dummy layer 114, and a columnar spacer 112 are formed in a position overlapping with the TFT. Here, an example is shown in which a bottom-gate TFT using an amorphous semiconductor film is formed.

A TFT of the present invention is not limited to a bottom-gate (inversely staggered) TFT. The present invention can be applied to a TFT having any structure. For example, a top-gate TFT or a staggered can be used. Further, the transistor is not limited to a transistor having a single-gate structure; a multi-gate transistor having a plurality of channel formation regions, such as a double-gate transistor may be used. In addition, a manufacturing method of the TFT is not limited and a known technique may be used therefor.

First, the gate wiring 103 and a capacitor wiring 102 are formed over the substrate 100 having an insulating surface such as a glass substrate. Then, a gate insulating film 105 is formed so as to cover the gate wiring 103 and the capacitor wiring 102.

Subsequently, an amorphous semiconductor film, for example, an amorphous silicon film is formed over the gate insulating film 105 by a PCVD method and the amorphous semiconductor film is selectively etched to have a desired top view shape; thus, a semiconductor layer 104 is formed so as to overlap with the gate wiring 103 with the gate insulating film 105 therebetween. Next, a semiconductor film which contains an impurity element for imparting n-type conductivity to a semiconductor is formed and the semiconductor film is selectively etched to have a desired top view shape; thus, a first n-type semiconductor layer is formed over the semiconductor layer 104. Then, a conductive film is formed over the first n-type semiconductor layer and the conductive film is selectively etched to have a desired top view shape; thus, the source wiring 101, a drain electrode 107, and a capacitor electrode are formed. Note that the capacitor electrode overlapping with the capacitor wiring 102 with the gate insulating film 105 therebetween such that an auxiliary capacitor is formed with the gate insulating film 105 serving as a dielectric body. Then, a second n-type semiconductor layer 106 is formed by etching the first n-type semiconductor layer in a self-aligned manner with using the source wiring 101 and the drain electrode as a mask. Further, an upper part of an exposed portion of the semiconductor layer 104 is etched using the source wiring 101 and the drain electrode as a mask in order to form a portion thinner than a region overlapping with the source wiring 101 and the drain electrode. Thus, a channel-etch type TFT is formed. Then, a protective film 108 is formed so as to cover the partially exposed semiconductor layer is formed. The foregoing steps can be implemented with known techniques.

In this embodiment mode, a TFT in which an amorphous semiconductor film is used as a channel formation region is shown, but it is not limited thereto. A TFT may have a crystalline semiconductor film such as a polysilicon film or a microcrystalline silicon film as a channel formation region.

A planarizing film 110 serving as an interlayer insulating film is formed. Then, the planarizing film 110 and the protective film 108 are selectively etched to form a first opening which reaches the drain electrode and a second opening which reaches the capacitor electrode are formed. Next, a transparent conductive film is formed over the planarizing film 110.

As a material of the transparent conductive film, a transparent conductive material, such as, indium fin oxide (ITO), indium tin oxide containing a Si element (ITSO), indium zinc oxide (IZO) in which zinc oxide (ZnO) is mixed with indium oxide; or a compound which includes a mixture thereof can be used.

Then, the transparent conductive film is selectively etched to form the first dummy layer 113 and the second dummy layer 114, which overlap with the and the pixel electrode 109, which is electrically connected to the drain electrode and the capacitor electrode. The dummy layers are provided in a position overlapping with the TFT and they can distribute and relieve pressure applied to the TFT in a later step of attaching the pair of substrates. The first dummy layer 113, the second dummy layer 114, and the pixel electrode 109 are formed of the same material. In FIG. 1A, the first dummy layer 113 overlaps with at least a part of the channel formation region, a part of the source electrode, and a part of the drain electrode of the TFT. In addition, the second dummy layer 114 is overlapped with at least a part of the channel formation region and a part of the drain electrode of the TFT. Although not shown here, a terminal electrode for connecting an FPC later is formed over the same substrate and in the same step as the pixel electrode.

Then, an insulating film which covers the first dummy layer 113, the second dummy layer 114, and the pixel electrode 109 is formed. As a material of the insulating film, a resin material such as an epoxy resin, an acrylic resin, a phenol resin, a novolac resin, a melamine resin, a urethane resin, or the like can be used. Alternatively, as a material of the insulating film, an organic material such as benzocyclobutene, parylene, polyimide, or the like, a compound material formed by polymerization such as siloxane-based polymer or the like, a composition material containing a water-soluble homopolymer and a water-soluble copolymer, or the like can be used. A pigment such as carbon may be contained in any of the foregoing materials to make a black resin so that the insulating film serving as a light blocking film.

Then, the insulating film is selectively etched to form the columnar spacer 112 which overlaps with the first dummy layer 113 and the second dummy layer 114. In addition, the columnar spacer 112 overlaps with the TFT. In FIG. 1A, the columnar spacer 112 overlaps with at least the channel formation region, parts of the source electrode and the drain electrode of the TFT. Note that the top view of FIG. 4B only shows the first dummy layer 113, the second dummy layer 114, the pixel electrode 109, and the columnar spacer 112, which are formed over the planarizing film 110, for clear understanding of FIG. 1A.

Figure 1B:
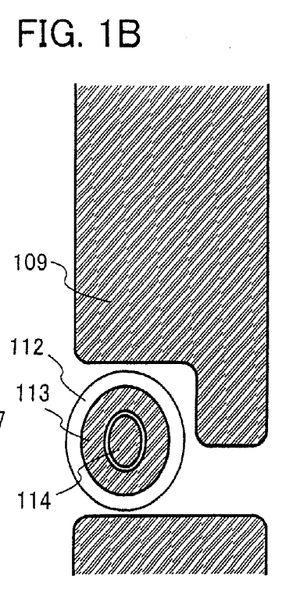
Figure 1C:
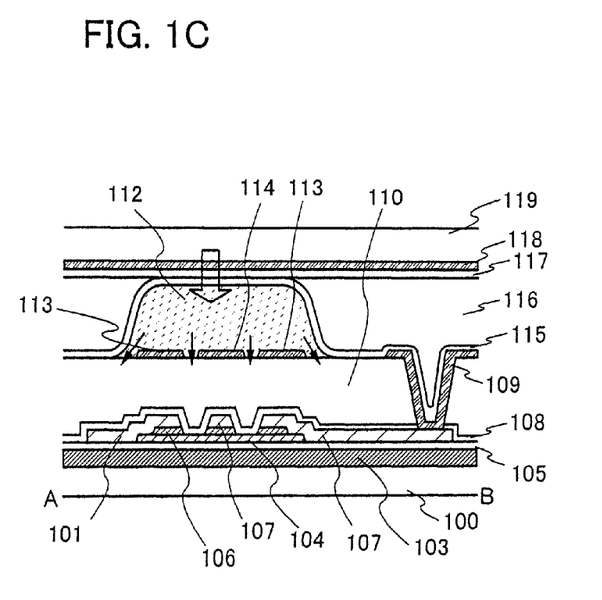

As shown in FIG. 1B, the first dummy layer 113 and the second dummy layer 114 are set apart by a ring-shaped slit and the columnar spacer 112 is formed to cover the first dummy layer 113. The columnar spacer 112 preferably has a trapezoidal cross-sectional shape as shown in FIG. 1C in order to distribute pressure applied in a later step of attaching the pair of substrates. Note that the outline arrow and a plurality of black arrows in FIG. 1C schematically show applied pressure and distributed pressure in the step of attaching the pair of substrates, respectively. In addition, the columnar spacer 112 preferably has a frustum shape so that the area of the top surface which is in contact with the counter substrate side is larger than that of the bottom surface which is on the TFT side.

The first dummy layer 113 and the second dummy layer 114 improve adhesion of the columnar spacer 112. In addition, the columnar spacer 112 can prevent short circuit of the first dummy layer 113 and the pixel electrode 109. In addition, when a black resin is used as the columnar spacer 112, the columnar spacer 112 can serve as a light blocking film overlaps with the TFT.

Figure 2A:
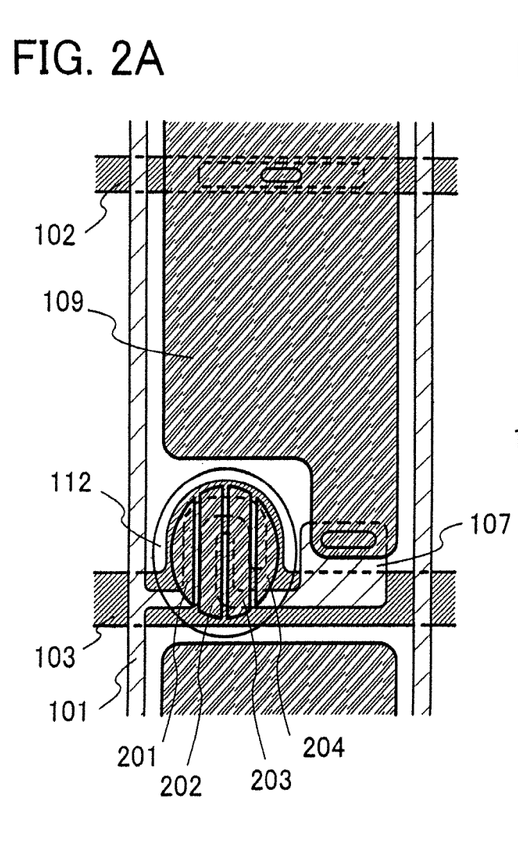
FIGS. 2A and 2B are top views illustrating a pixel structure.
Figure 2B:
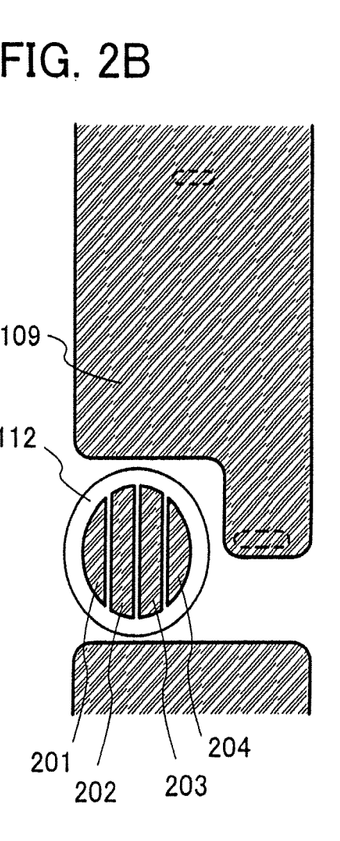

Note that the number of dummy layers and the shape of the dummy layer overlapping with the columnar spacer 112 are not limited and a top view shape shown in FIG. 2A may be employed, for example. FIG. 2A has the same structure as that in FIG. 1A except that the number and the shapes of dummy layers are different. Note that FIG. 2B only shows a first dummy layer 201, a second dummy layer 202, a third dummy layer 203, a fourth dummy layer 204, the pixel electrode 109, and the columnar spacer 112, which are formed over the planarizing film 110, for clear understanding of FIG. 2A. When large number of dummy layers in the position inner than the bottom edge of the columnar spacer are provided, adhesion of the columnar spacer and the interlayer insulating film can be further improved.

An example in which the dummy layer is provided in a position inner than the bottom edge of the columnar spacer is shown in FIGS. 1A to 2C, but the structure is not limited thereto. The dummy layer may have a pattern shape which is continuous mesh-shaped, and has a gap with the pixel electrodes. A structure in which the dummy layer has a pattern which is a continuous mesh shape, and the dummy layer does not touch the pixel electrodes may be provided. The columnar spacer may be provided to overlap with a TFT and a part of the continuous mesh-shaped dummy layer. The continuous mesh-shaped dummy layer can prevent light leakage which occurs due to disorder of the electric field which is generated between the neighboring pixel electrodes, or so-called disclination. That is, the continuous mesh-shaped dummy layer serves as an electric field blocking pattern.

After the columnar spacer 112 is formed over the substrate 100 in the foregoing manner, the substrate 100 and the counter substrate 119 are attached to each other maintaining a predetermined gap therebetween. The gap between the substrates is depends on by the dummy layer and the columnar spacer. The gap varies in accordance with the kind and characteristics of a liquid crystal material. In this embodiment mode, the gap is 3 to 4 µm.

The space between the pair of substrates is filled with a liquid crystal layer 116. In the case where a liquid crystal dropping method is used, a closed-loop shaped sealant is formed over one substrate, and a liquid crystal material is dropped in a region surrounded by the sealant, then, the other substrate is attached thereto under a reduced-pressure atmosphere. In the case where a liquid crystal injecting method is used, after a pair of substrates is attached to each other, a liquid crystal material is injected through an inlet for liquid crystal injection in the sealant pattern by utilizing a capillary action. The sealant may include a filler so that the gap between the pair of substrates is maintained.

An alignment film to align liquid crystal molecules in the liquid crystal layer 116 is provided to each of the substrates. As shown in FIG. 1C, a first alignment film 115 is formed over the substrate 100, and a counter electrode 118 and a second alignment film 117 are formed over the counter substrate 119. Then, a rubbing treatment is performed on each of the alignment films. As for the alignment mode of liquid crystal, a TN mode, in which orientation of liquid crystal molecules is twisted by 90° from where light enters toward where light is emitted, is used in many cases. In the case of manufacturing a TN mode liquid crystal display device, the substrates are attached in a manner such that a rubbing direction of the rubbing treatment performed on the alignment film over the substrate 100 and a rubbing direction of the rubbing process performed on the alignment film over the counter substrate 119 intersect at right angles. Here, an example in which alignment films are used to align the liquid crystal molecules is shown, but it is not limited thereto. Another alignment method, such as a photo-alignment method may be used.

Note that the alignment film is not formed in a portion where a terminal electrode is formed. In addition, after the counter substrate 119 and the substrate 100 are attached to each other, a part of the counter substrate is removed so that the portion where the terminal electrode is formed overlaps with the counter substrate either. Then, the terminal electrode is attached to an FPC (flexible printed circuit) so as to be connected to an external circuit. As a method for mounting the FPC, a connecting method using an anisotropic conductive material or a metal bump, or a wire bonding method can be employed. A connector for connection to the external circuit is not limited to the FPC, and another connector, such as a TAB (tape automated bonding) tape or a TCP (tape carrier package) may be used. TCP is a TAB tape provided with an IC, in which a TAB tape is connected to a wiring over an element formation substrate and an IC is mounted thereon.

On the periphery of the pixel portion, an IC chip in which a driver circuit for transmitting signals to the pixel portion is formed may be electrically connected by an anisotropic conductive material. In order to form a pixel portion capable of performing color display, 3072 data lines and 768 scan lines are necessary for the XGA display class. Such number of data lines and scan lines are segmented per several blocks at an end portion of the pixel portion and provided with lead wirings, and gathered in accordance with the pitch of output terminals of the IC. The IC chip may be mounted by a known method such as a COG (chip on glass) method.

If necessary, an optical film such a polarizing plate, a circularly polarizing plate (including an elliptically polarizing plate), a retardation plate (a quarter-wave plate or a half-wave plate), or a color filter may be appropriately provided to the substrate 100 or the counter substrate 119.

Through the foregoing steps, a display module having an active matrix liquid crystal display device can be manufactured.

The foregoing liquid crystal display device is not particularly limited and TN liquid crystal, IPS liquid crystal, OCB liquid crystal, STN liquid crystal, VA liquid crystal, ECB liquid crystal, GH liquid crystal, polymer dispersed liquid crystal, discotic liquid crystal, or the like can be used for the liquid crystal display device. Among them, a normally black liquid crystal panel, such as a transmissive-type liquid crystal display device utilizing a vertical alignment (VA) mode is preferable. Some examples are given as a vertical alignment mode, and for example, an MVA (multi-domain vertical alignment) mode, a PVA (patterned vertical alignment) mode, an ASV mode can be employed. In specific, one pixel is divided into a plurality of sub-pixels and a projection portion is provided in a position of a counter substrate corresponding to the center of each sub-pixel, so that multi-domain pixel is formed. This driving method, in which a pixel is divided into a plurality of sub-pixels and a projection portion is provided in a position of a counter substrate corresponding to the center of each sub-pixel to achieve division alignment (multi domain) in order to realize wide viewing angle, is referred to as sub-pixel driving. Note that the projection portion may be provided on either or both the counter substrate and the element substrate. The projection portion makes liquid crystal molecules align radially and improves controllability of the alignment.

Further, the electrode for driving liquid crystal, that is, the pixel electrode may have a top view shape like a comb-shape or a zigzagged shape so that a direction in which voltage is applied may be varied. Alternatively, a multi-domain pixel may be formed utilizing photo-alignment.

A switching element connected to the pixel electrode is not limited to an amorphous TFT using a semiconductor film with an amorphous structure, and an organic transistor, a three-terminal active element such as a polysilicon TFT, or a two-terminal active element such as a diode, an MIM, or a ZnO varistor can be used.

(Embodiment Mode 2)

An example in which a columnar spacer is formed over an element substrate is shown in Embodiment Mode 1. In this embodiment mode, an example in which a columnar spacer is formed over a counter substrate is shown.

First, as in Embodiment Mode 1, a dummy layer and a pixel electrode are formed over one element substrate. Note that the dummy layer is formed in a position overlapped with a switching element. In this embodiment mode, a top-gate TFT using a semiconductor film with a crystalline structure, such as a polysilicon film is used as the switching element. The top-gate TFT may be an n-channel TFT or a p-channel TFT. In addition, a double-gate structure is employed here in order to reduce variation in electric characteristics. Further, the n-channel TFT may have an LDD (lightly doped drain) structure in order to reduce an off-current value. In the LDD structure, a region to which an impurity element is added at low concentration is provided between a channel formation region and a source or drain region formed by being added with an impurity element at high concentration. The region is referred to as an LDD region. The LDD structure has an advantageous effect on relaxation of an electric field in the vicinity of the drain to prevent deterioration due to hot-carrier injection. Further, the n-channel TFT may have a GOLD (gate-drain overlapped LDD) structure in order to prevent reduction in on-current value due to the hot carrier. The GOLD structure in which an LDD region overlaps with a gate electrode with a gate insulating film therebetween, has a further advantageous effect on further relaxation of an electric field in the vicinity of the drain to prevent deterioration due to hot-carrier injection, compared with the LDD structure. By employing such a GOLD structure, electric field intensity in the vicinity of the drain is relaxed and hot carrier injection can be prevented, which is effective for prevention of deterioration phenomenon. The pixel electrode is electrically connected to the switching element.

Both the dummy layer and the pixel electrode are formed of a conductive film, typically ITO; therefore, a cushioning material can be provided without an increase in the number of processing steps. In addition, since the dummy layer has a light-transmitting property, scattering of light or the like hardly occurs. Then, an alignment film which covers and is in contact with the dummy layer and the pixel electrode is formed.

A counter substrate to be attached to the element substrate is prepared. A color filter and a counter electrode are provided on the counter substrate. The counter electrode is formed over the color filter here, but the order of stacking these layers is not particularly limited.

Next, a columnar spacer is formed over the counter electrode of the counter substrate. An alignment film which covers and is in contact with the columnar spacer is formed if necessary. The element substrate and the counter substrate are attached to each other so that the columnar spacer and the dummy layer overlap with each other. Accordingly, the columnar spacer is provided in the position overlapping with the switching element. In addition, it is preferable that a black resin containing a pigment such as carbon be used as the columnar spacer so that the columnar spacer serves as a light blocking film of the switching element.

The dummy layer can distribute and relieve pressure applied to the switching element in a step of attaching the element substrate and the counter substrate to each other. In addition, the shape of the dummy layer and the number of dummy layers are not specifically limited as long as the dummy layer can distribute and relieve the pressure. A plurality of dummy layers or a dummy layer with a complex shape such as an S-shape, an M-shape, or a cross-shape may be provided. In particular, in the case of providing the columnar spacer on the counter substrate, the top portion of the columnar spacer and the dummy layer overlap with the alignment film therebetween; therefore, the dummy layer preferably has the total area which is larger than the area of the top portion of the columnar spacer. In that case, the end portion of the dummy layer located outside the columnar spacer.

In addition, in the case of providing the columnar spacer so as overlap with the switching element, even if the columnar spacer is misaligned, a problem hardly arises, because the neighboring pixel electrode is spaced farther from the switching element compared to other places and sufficient margin can be allowed. In other words, aperture ratio can be prevented from being reduced because the columnar spacer and the pixel electrode overlap with each other in the attaching step. As long as the pixel electrode and the columnar spacer do not overlap with each other, the attaching step may be carried out such that the end portion of the dummy layer may be purposely located outside the columnar spacer.

In the case where the columnar spacer is provided to the counter substrate, when the formation of the dummy layer serving as a cushioning material is formed of the same material as the pixel electrode between the switching element and the columnar spacer, the switching element can be protected without an increase in the number of processing steps.

This embodiment mode can be freely combined with Embodiment Mode 1.

Further detailed description of the present invention is given in Embodiments below.

[Embodiment 1]

In this embodiment, an example of a transmissive-type liquid crystal display device using a vertical alignment (VA) mode is described with reference to FIGS. 3 to 5.

Figure 3:
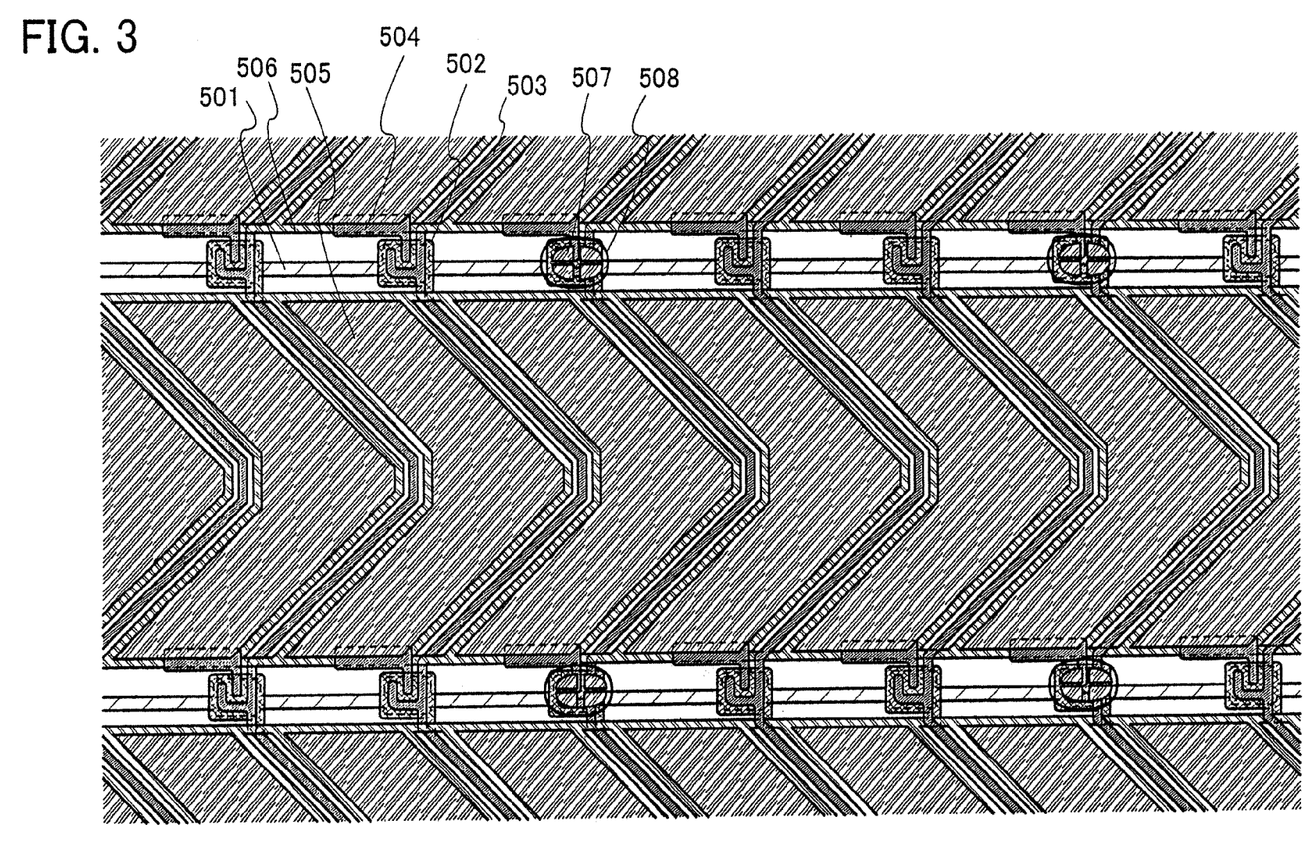
FIG. 3 is a top view illustrating a pixel structure.

FIG. 3 shows a plan view of a pixel structure of a VA-type liquid crystal panel (specifically, a panel of a PVA mode). A top view shape of each of the pixel electrodes 505 is a complex octagon, as shown in FIG. 3. In the pixel portion, a gate wiring 501, a source wiring 503, and a capacitor wiring 506 are provided and a semiconductor layer 502 is provided close to an intersection of the gate wiring and the source wiring. Here, a bottom-gate TFT including the gate wiring, the source wiring, and the semiconductor layer is used as a switching element. A drain electrode is an electrode for electrically connecting a drain region of the TFT and the pixel electrode 505. A drain electrode 504 partially overlaps with the capacitor wiring 506 to form a storage capacitor.

In addition, four dummy layers 507 which are formed of the same material as the pixel electrode are provided in positions overlapping with the TFT. A columnar spacer 508 is provided such that it covers these dummy layers 507. The columnar spacer 508 is also provided in a position overlapping with the TFT, and regulates the gap between the substrates. When these dummy layers 507 are provided in the positions overlapping with the TFT, an advantageous effect is obtained in that pressure applied to the TFT in a step of attaching the substrates to each other is distributed and relieved. The dummy layers 507 are also formed in order to improve adhesion of the columnar spacer 508. One columnar spacer 508 is provided for three pixel electrodes, but the structure is not limited thereto, and for example, each pixel electrode may be provided with one of the columnar spacer 508s. In addition, a black resin may be used as the columnar spacer 508 so that the columnar spacer 508 also serves as a black matrix. When the black resin is used, the columnar spacer 508 also serves as a light blocking film of the TFT.

Figure 4:
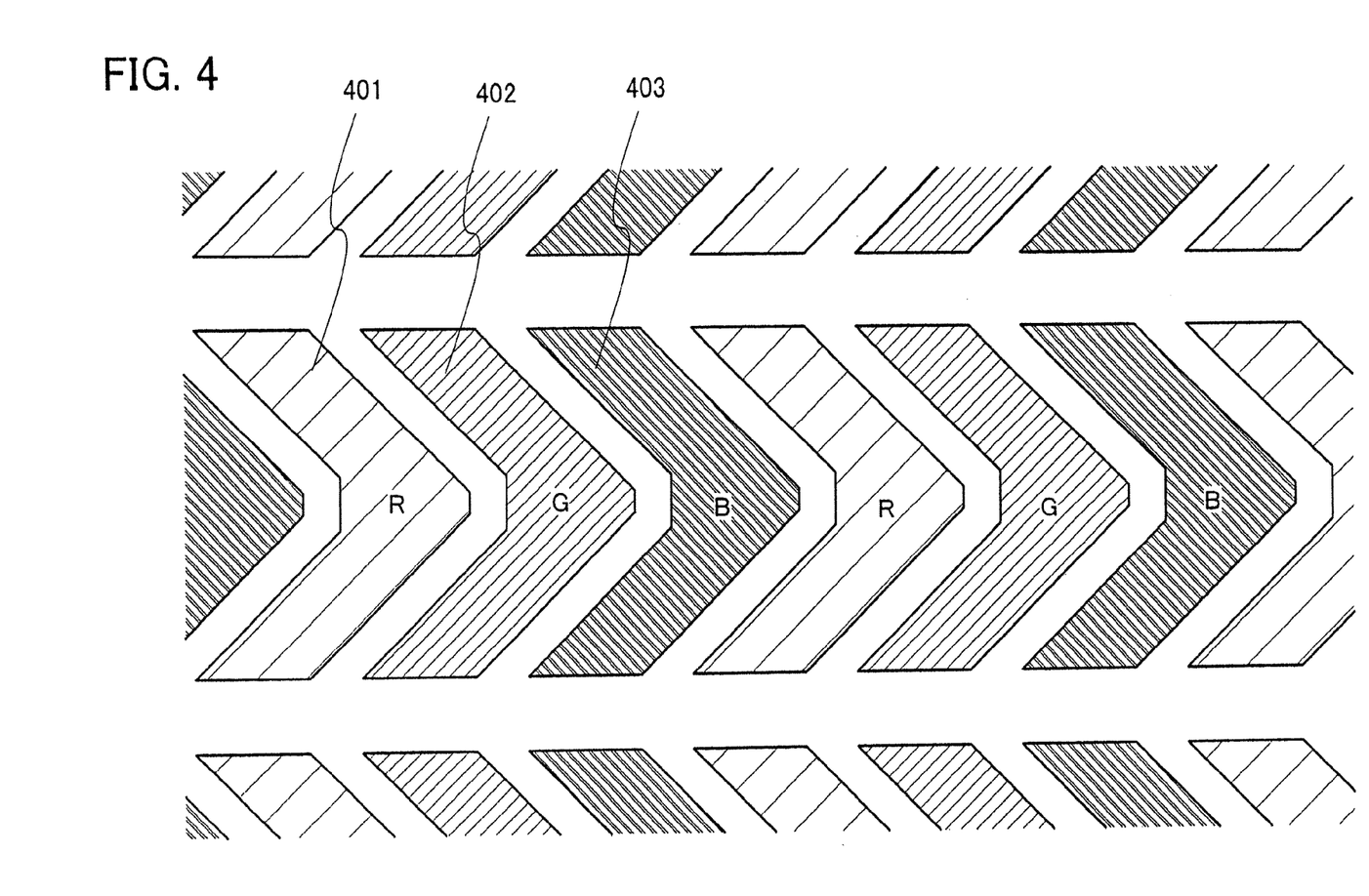
FIG. 4 is a plan view illustrating arrangement of color layers.

FIG. 4 shows a top view of a part of a color filter. In FIG. 4, a pixel group includes three colors: a first color layer 401 (R), a second color layer 402 (G), and a third color layer 403 (B). The top view shape of each color layer is a complicated octagon similar to the shape of the pixel electrode 505.

Figure 5:
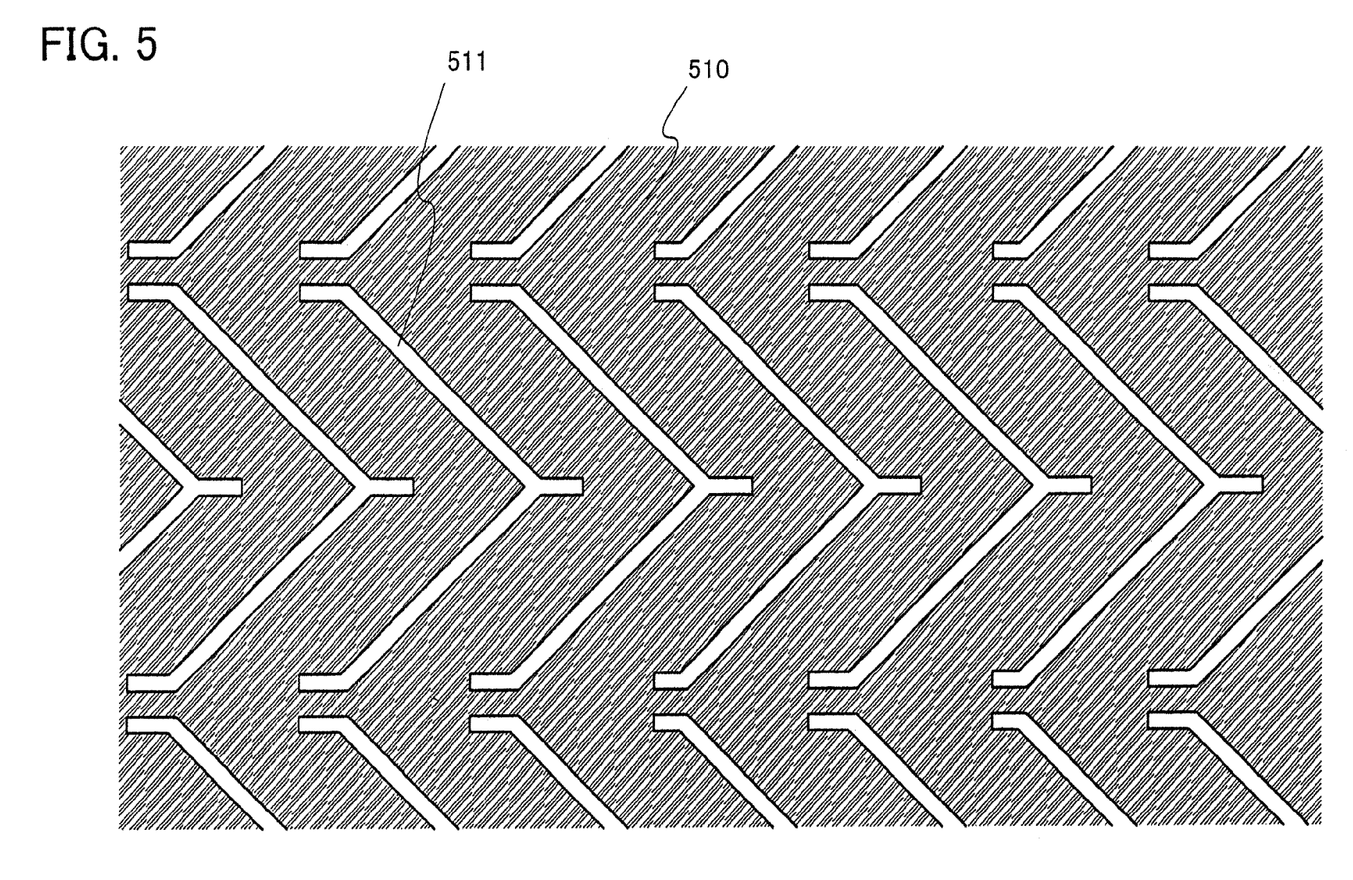
FIG. 5 is a plan view illustrating a shape of a counter electrode.

A structure of the counter substrate side is shown in FIG. 5. The counter electrode 510 is shared by different pixels and has a slit 511. The slits 511 and slits of the pixel electrodes 505 and the pixel electrode 505 side (gaps between neighboring pixel electrodes) are provided so as to alternately mesh with each other, and thus, oblique electric fields can be effectively generated and orientation of liquid crystal can be controlled well. Thus, an orientation direction of the liquid crystals can be varied depending on the place, and therefore, the viewing angle can be widened.

When the dummy layer 507 and the columnar spacer 508 are provided in such a manner, adhesion of the columnar spacer can be improved. In addition, a portion in which the TFT is formed has more layers than other portions and the total thickness of layers tends to be large. Therefore, when the columnar spacer is formed in a position overlapping with the TFT, an advantage is obtained in that the gap between the substrates is easily adjusted. In addition, the present invention can realize a liquid crystal display device with high definition and high aperture ratio by providing the dummy layer 507 and the columnar spacer 508. In addition, the present invention provides a liquid crystal display device which can realize a high display quality under outdoor light without an increase in the number of processing steps.

This embodiment mode can be freely combined with Embodiment Mode 1 or 2.

[Embodiment 2]

In embodiment modes, an example of a TN mode liquid crystal display device is shown. In this embodiment, an example of an IPS (in plane switching) mode liquid crystal display device is shown in FIGS. 6A and 6B.

Figure 6A:
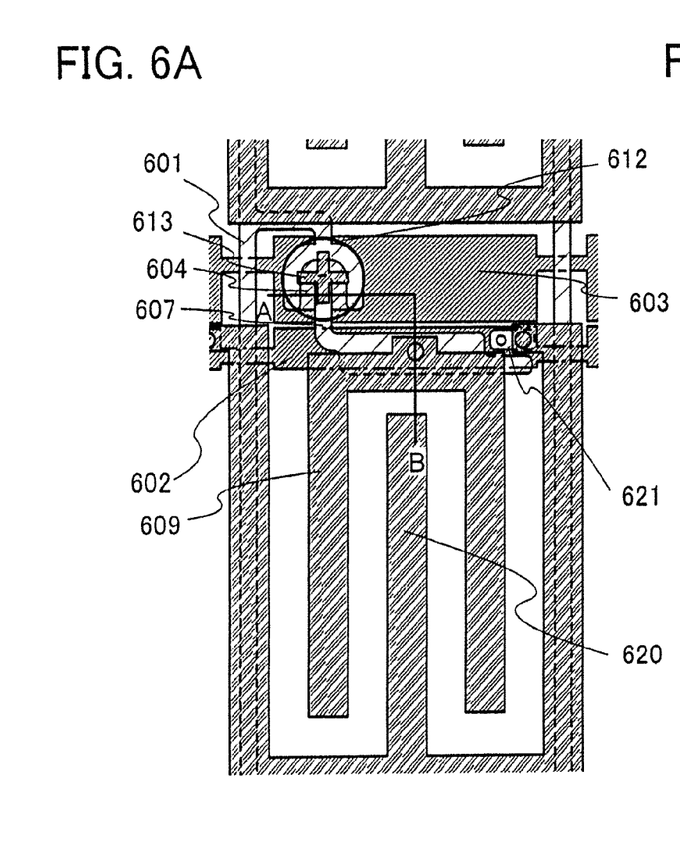
FIGS. 6A and 6B are a top view and a cross-sectional view illustrating a pixel structure.
Figure 6B:
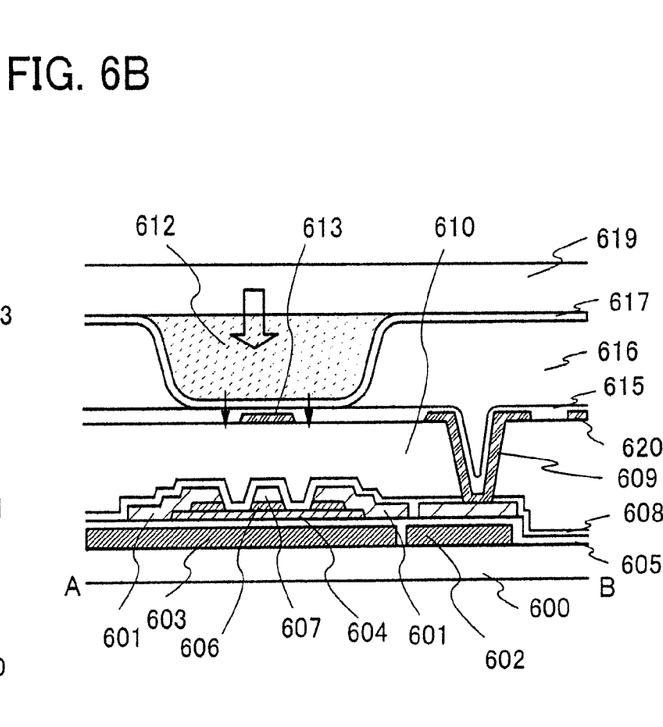

FIG. 6A shows a top view of one pixel included in a pixel portion in an IPS mode liquid crystal display device. FIG. 6B shows a cross-sectional view taken along the line A-B in FIG. 6A.

An IPS mode liquid crystal display device performs display with a method in which one substrate 600 of a pair of substrates that sandwich liquid crystal is provided with a pixel electrode 609 and a common electrode 620, and liquid crystal molecules are rotated in an electric field which is generated between those electrodes and which is approximately parallel to a substrate surface so that switching of light is performed.

Over the substrate 600, an active element is provided close to an intersection of a source wiring 601 and a gate wiring 603. Here, a TFT is used as an active element and the TFT is electrically connected to the pixel electrode 609 and serves as a switching element. On-state or Off-state of the TFT is controlled with voltage applied to the gate wiring 603, an electric field is formed between the pixel electrode 609 and the common electrode 620 (this electric field is referred to as a horizontal electric field), and liquid crystal molecules in a liquid crystal layer 616 are rotated in a plane approximately parallel to a substrate surface, and thereby the liquid crystal display device is driven.

Since the liquid crystal molecules included in the liquid crystal layer 616 are rotated in a plane approximately parallel to a substrate surface, inversions of gradation and hue depending on viewing angles are not generated; accordingly, a viewing angle can be widened compared with a TN mode liquid crystal display device. Note that, in the IPS mode liquid crystal display device, arrangement of a pair of polarizing plates is different from that of the TN mode liquid crystal display device, and the polarizing plates are arranged so as to perform black display when no voltage is applied to the pixel electrode.

In the present invention, a dummy layer 613 having a cross-shape is formed in a position which overlaps with that of the TFT. Here, an example in which a bottom-gate TFT using an amorphous semiconductor film 604 is formed is shown.

First, the gate wiring 603 and the capacitor wiring 602 are formed over the substrate 600 having an insulating surface, such as a glass substrate. Then, the gate insulating film 605 which covers the gate wiring 603 and the capacitor wiring 602 is formed. Then, the gate insulating film is selectively etched to form an opening which reaches a tip of the gate wiring and an opening which reaches the capacitor wiring.

An amorphous semiconductor film, for example, an amorphous silicon film, is formed over the gate insulating film 605 by a PCVD method and the amorphous semiconductor film is selectively etched to have a desired top view shape; thus, a semiconductor layer overlapping with the gate wiring 603 with the gate insulating film 605 therebetween is formed. Next, a semiconductor film in which a semiconductor contains an impurity element for imparting n-type conductivity is formed and the semiconductor film is selectively etched to have a desired top view shape; thus, a first n-type semiconductor layer is formed over the semiconductor layer. Then, a conductive film is formed over the first n-type semiconductor layer and the conductive film is selectively etched to have a desired top view shape; thus, the source wiring 601, a drain electrode 607, and a connection electrode 621 are formed. Note that the drain electrode 607 overlapping with the capacitor wiring 602 with the gate insulating film 605 therebetween such that an auxiliary capacitor is formed with the gate insulating film 605 serving as a dielectric body. The connection electrode 621 is provided so as to be electrically connected to the capacitor wiring 602 through an opening in the gate insulating film so that the common electrode 620, which is formed later is electrically connected to capacitor wiring 602.

Then, a second n-type semiconductor layer 606 is formed by etching the first n-type semiconductor layer in a self-aligned manner using the source wiring 601 and the drain electrode 607 as a mask. Further, an upper part of an exposed portion of the semiconductor layer is etched using the source wiring 601 and the drain electrode 607 as a mask in order to form a portion thinner than a region overlapping with the source wiring 601 and the drain electrode 607. Thus, a channel-etch type TFT is formed. Then, a protective film 608 which covers an exposed semiconductor layer is formed. The foregoing steps can be implemented with known techniques.

A planarizing film 610 which serves as an interlayer insulating film is formed. Then, the planarizing film 610 and the protective film 608 are selectively etched to form a first opening which reaches the drain electrode and a second opening which reaches the connection electrode 621. Next, a transparent conductive film is formed over the planarizing film 610.

As a material of the transparent conductive film, a transparent conductive material, such as indium tin oxide (ITO), indium tin oxide containing a Si element (ITSO), indium zinc oxide (IZO) in which zinc oxide (ZnO) is mixed with indium oxide, or the like; or a compound which includes a mixture thereof can be used.

Then, the transparent conductive film is selectively etched to form the dummy layer 613, which overlaps with the TFT; the pixel electrode 609, which is electrically connected to the drain electrode; and the common electrode 620, which is electrically connected to the connection electrode 621. The dummy layer 613 is provided in a position overlapping with the TFT and can distribute and relieve pressure applied to the TFT in a later step of attaching the pair of substrates. In FIG. 6A, the dummy layer 613 overlaps with at least a part of the channel formation region, a part of the source electrode, and a part of the drain electrode of the TFT. The dummy layer 613, the common electrode 620, and the pixel electrode 609 are formed of the same materials. Although not shown, a terminal electrode for connecting an FPC later is formed over the same substrate and in the same step as the pixel electrode.

In this embodiment, the common electrode 620 and the pixel electrode 609 are formed of the same material over the same insulating film, but the structure is not limited thereto. For example, a structure may be employed in which after a common electrode is formed of a metal material, an insulating film is formed, and a pixel electrode formed of a transparent conductive film is provided over the insulating film.

A first alignment film 615 which covers the dummy layer 613, the common electrode 620, and the pixel electrode 609 is formed. Then, a rubbing treatment is performed on the first alignment film 615.

Then, a counter substrate 619 is prepared. A columnar spacer 612 is provided on the counter substrate. Note that a color filter and the like may be provided, if necessary, before forming the columnar spacer.

As a material of the columnar spacer 612, a resin material such as an epoxy resin, an acrylic resin, a phenol resin, a novolac resin, a melamine resin, a urethane resin, or the like can be used. Alternatively, as a material of the columnar spacer, an organic material such as benzocyclobutene, parylene, polyimide, or the like, a compound material formed by polymerization such as siloxane-based polymer or the like, a composition material containing a water-soluble homopolymer and a water-soluble copolymer, or the like can be used. A pigment such as carbon may be contained in any of foregoing materials to make a black resin so that the columnar spacer serving as a light blocking film.

Then, a second alignment film 617 which covers the columnar spacer 612 is formed. Then, a rubbing treatment is performed on the second alignment film 617.

The substrate 600 and the counter substrate 619 are attached to each other maintaining a predetermined gap therebetween. The substrates are attached and fixed in such a manner that the columnar spacer provided on the counter substrate 619 and the dummy layer 613 provided on the substrate 600 overlap with each other. The gap between the substrates depends on the dummy layer and the columnar spacer. The gap varies depending on the kind and characteristics of a liquid crystal material. In this embodiment mode, the gap is 2 to 6 μm.

An example in which the cross-shaped dummy layer is provided in a position inner than the bottom edge of the columnar spacer is shown in FIG. 6A, but the structure is not limited thereto. A structure in which the dummy layer has a pattern which is a continuous complex shape, and the dummy layer does not touch the pixel electrodes may be provided. The positions of the substrate 600 provided with the dummy layer and the TFT and the counter substrate 619 provided with the columnar spacer may be set so that the columnar spacer overlaps with the TFT and a part of the dummy layer with a continuous complex pattern shape. In FIG. 6A, the columnar spacer 612 overlaps with at least the channel formation region, a part of the source electrode, and a part of the drain electrode of the TFT. A part of the dummy layer, which extends out from the columnar spacer may be used to prevent light leakage which occurs due to disorder of the electric field which is generated between the neighboring pixel electrodes, or so-called disclination.

A space between the pair of substrates is filled with the liquid crystal layer 616. In the case where a liquid crystal dropping method is used, a closed-loop shaped sealant is formed over one substrate, and a liquid crystal material is dropped in a region surrounded by the sealant, then, the other substrate is attached thereto under a reduced-pressure atmosphere. In the case where a liquid crystal injecting method is used, after a pair of substrates is attached to each other, a liquid crystal material is injected through an inlet for liquid crystal injection in the sealant pattern by utilizing a capillary action. The sealant may include a filler so that the gap between the pair of substrates is maintained.

If necessary, an optical film such as a polarizing plate, a circularly polarizing plate (which may be an elliptically polarizing plate), or a retardation plate (a quarter-wave plate or a half-wave plate) as appropriately provided on the substrate 600 or the counter substrate 619.

Through the foregoing steps, a display module having an IPS mode liquid crystal display device can be manufactured.

According to the present invention, high yield can be realized for IPS mode liquid crystal display devices by providing one substrate with a dummy layer and providing the other substrate with a columnar spacer.

This embodiment mode can be freely combined with Embodiment Mode 1 or 2.

[Embodiment 3]

Examples of liquid crystal display devices and electronic appliances of the present invention are as follows: cameras such as video cameras or digital cameras, goggle type displays (head mounted displays), navigation systems, sound reproduction devices (car audio devices, audio components, and the like), notebook personal computers, game machines, mobile information terminals (mobile computers, mobile telephones, mobile game machines, electronic book devices, and the like), image reproduction devices provided with a recording medium (specifically, devices that replay a recording medium such as a digital versatile disc (DVD), and that are equipped with a display for displaying a replayed image), and the like. Specific examples of these electronic appliances are shown in FIGS. 7A to 7D and 8.

Figure 7A:
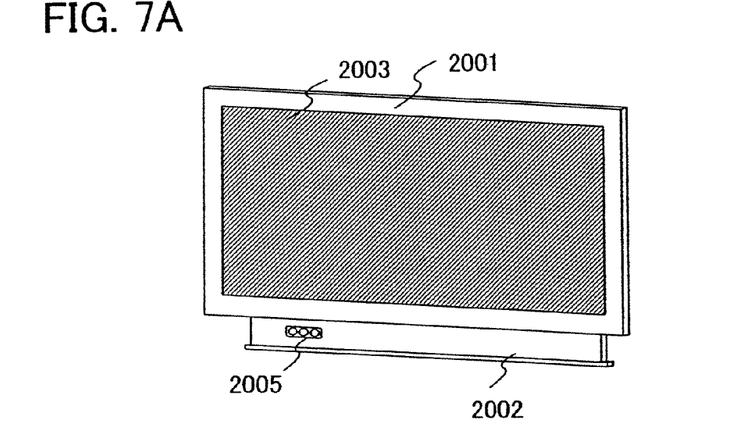
FIGS. 7A to 7D are views each illustrating an example of an electronic appliance.

FIG. 7A shows a large display device including a 22 to 50-inch large screen. The large display device includes a chassis 2001, a support 2002, a display portion 2003, a video input terminal 2005, and the like. The display portion 2003 corresponds to a liquid crystal module of Embodiment 1. Note that the term 'display device' includes any display device for displaying information, such as a display device for a personal computer, for receiving TV broad casting, or for interactive TV. According to the present invention, higher aperture ratio and higher definition of a large display device can be realized even when a fifth- or later-generation glass substrate having a side of greater than 1000 mm is used.

Figure 7B:
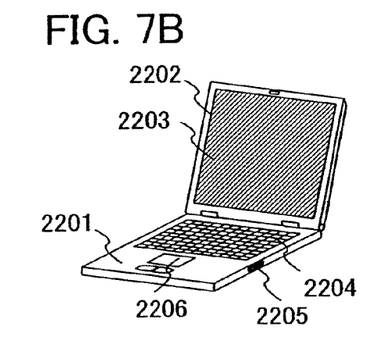

FIG. 7B shows a notebook personal computer including a main body 2201, a chassis 2202, a display portion 2203, a keyboard 2204, an external connection port 2205, a pointing device 2206, and the like. According to the present invention, higher aperture ratio and higher definition of a notebook personal computer can be realized.

Figure 7C:
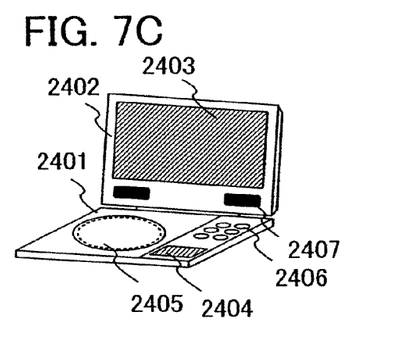

FIG. 7C shows a mobile image reproduction device provided with a recording medium (specifically, a DVD player device), which includes a main body 2401, a chassis 2402, a display portion A 2403, a display portion B 2404, a recording medium (a DVD or the like) reading portion 2405, an operation key 2406, a speaker portion 2407, and the like. The display portion A 2403 mainly displays image information, and the display portion B 2404 mainly displays character information. Note that the term 'image reproduction device equipped with a recording medium' includes a home-use game machine and the like. According to the present invention, higher aperture ratio and higher definition of an image reproduction device can be realized.

Figure 7D:
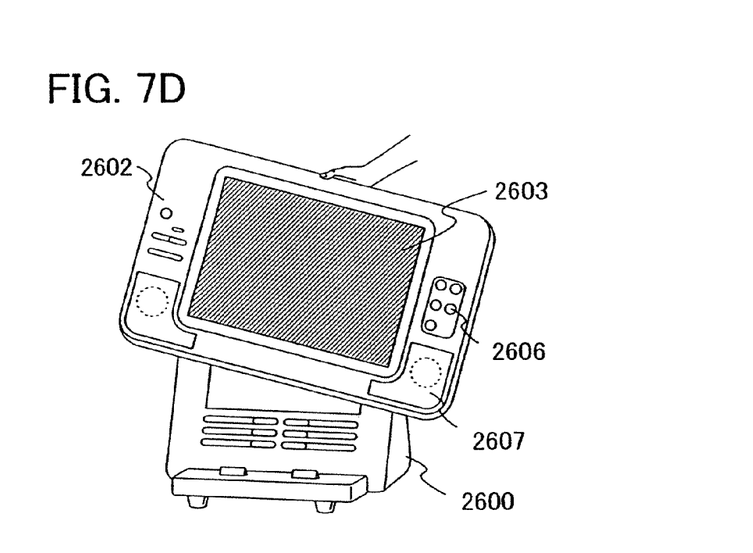

FIG. 7D shows a TV having a portable wireless display. A chassis 2602 incorporates a battery and a signal receiver. A display portion 2603 and a speaker portion 2607 are driven by the battery. The battery can be charged repeatedly by using a battery charger 2600. The battery charger 2600 can send and receive video signals, and can send the video signals to the signal receiver of the display. The chassis 2602 is controlled by operation keys 2606. The device shown in FIG. 7D can transmit signals from the chassis 2602 to the battery charger 2600 by operation of the operation keys 2606; therefore, the device can also be referred to as a video and audio interactive communication device. In addition, through operation of the operation keys 2606, the device can send signals from the chassis 2602 to the battery charger 2600, and by making the electronic appliance receive signals which can be sent from the battery charger 2600, the device can control communication with another electronic appliance; therefore, the device can also be referred to as a general-purpose remote control device. According to the present invention, higher aperture ratio and higher definition of a display can be realized.

Figure 8:
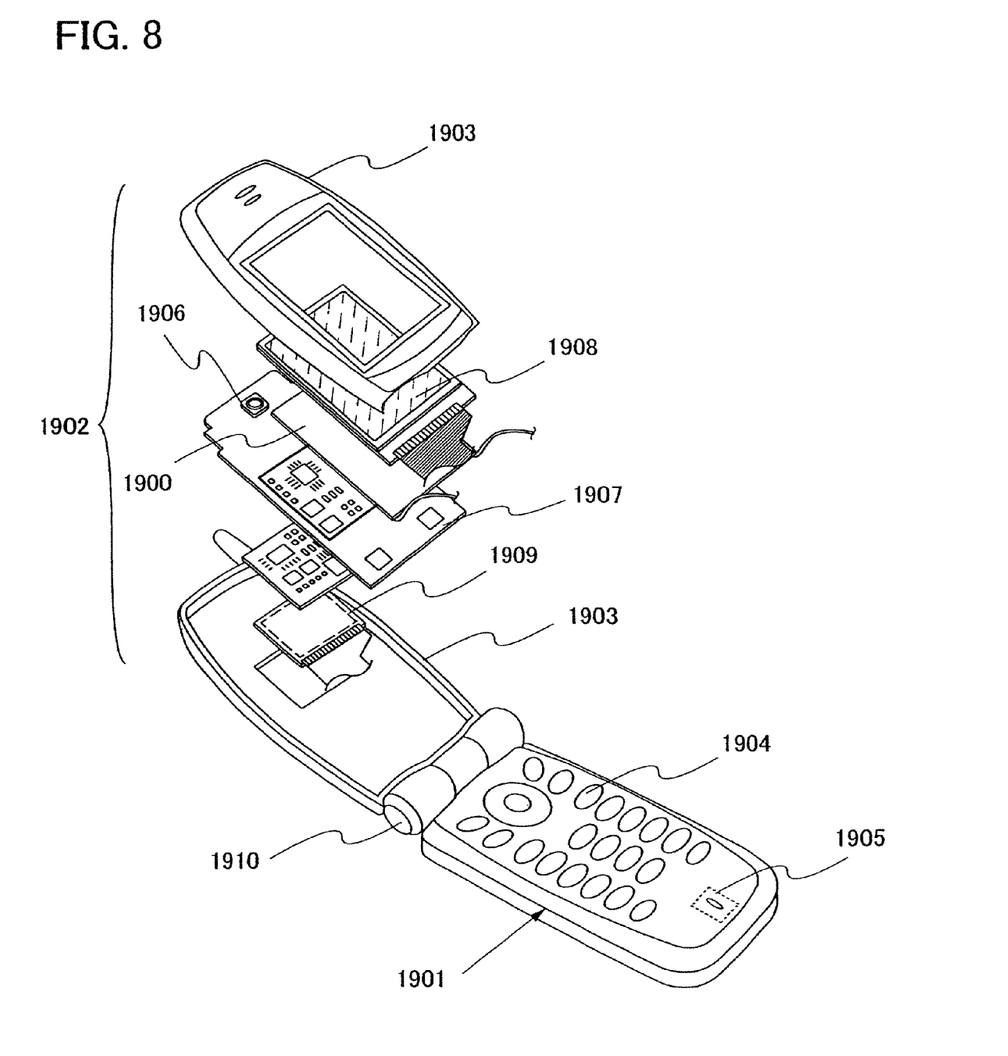
FIG. 8 is a view illustrating an example of electronic appliance.

In a mobile phone shown in FIG. 8, a main body (A) 1901 provided with operation switches 1904, a microphone 1905, and the like is connected to a main body (B) 1902 provided with a display panel (A) 1908, a backlight portion 1900, a display panel (B) 1909, a speaker 1906, and the like, by a hinge 1910 in such a way that the structure can open and close. The display panel (A) 1908 and the display panel (B) 1909 are housed in a chassis 1903 of the main body (B) 1902 together, with a circuit board 1907 and the backlight portion 1900. Pixel portions of the display panel (A) 1908 and the display panel (B) 1909 are arranged so as to be visible through openings formed in the chassis 1903. Here, the backlight portion 1900 and the display panel (A) 1908 are provided such that they overlap with each other to form a transmissive-type liquid crystal display device. As the backlight portion 1900, a cold-cathode tube or an LED element may be used. Further, a light guide plate and an LED element can be combined and used as the back light portion.

As for the display panel (A) 1908 and the display panel (B) 1909, specifications such as the number of pixels can be appropriately set in accordance with functions of the mobile phone. For example, the display panel (A) 1908 and the display panel (B) 1909 can be combined as a main screen and a sub-screen, respectively.

The mobile phone of this embodiment can take various forms depending on functions or applications thereof. For example, it may be formed as a mobile phone equipped with a camera by incorporating an imaging element in the hinge 1910. Further, the operation switches 1904, the display panel (A) 1908, and the display panel (B) 1909 may be housed in one chassis.

Figure 9A:
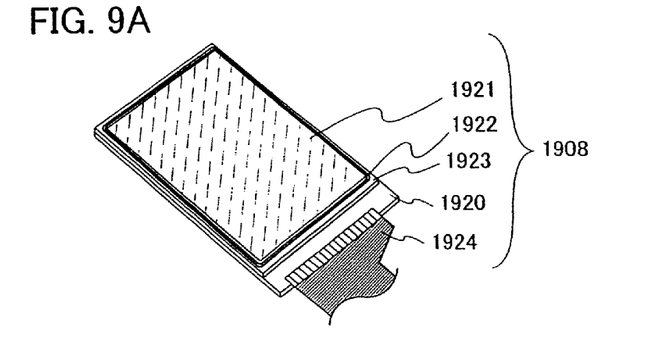
FIGS. 9A to 9D are views each illustrating an example of an electronic appliance.

FIG. 9A shows an example of a structure of the display panel (A) 1908. In the display panel (A) 1908, a first substrate 1920 provided with a pixel electrode, and a second substrate 1923 which faces the first substrate are attached to each other with a sealant 1922. In addition, the sealant 1922 is formed such that it surrounds a display portion 1921, and a liquid crystal layer is provided in a region enclosed by the first substrate, the second substrate, and the sealant. In the display panel (A) 1908 shown in FIG. 9A, liquid crystal is sealed by utilizing a liquid crystal dropping method, and attaching the substrates under a reduced pressure. The gap between the pair of substrates is maintained with a spacer; specifically, a spherical spacer, a columnar spacer, a filler in a sealant, or the like. Note that the spacer may be selected as appropriate depending on a liquid crystal mode (a TN mode, a VA mode, an IPS mode, or the like) for driving the display panel (A) 1908. Note that although the second substrate is not always provided with an electrode in an IPS mode, in other modes the second substrate is often provided with a counter electrode; and in such a case, when the pair of substrates is attached, connection for electrically connecting the counter electrode to a terminal electrode provided on the first substrate is also carried out.

Figure 9B:
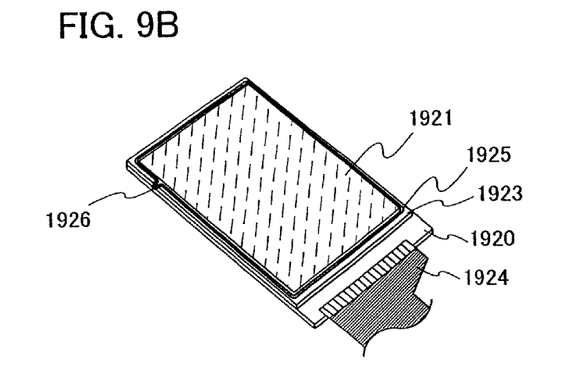

FIG. 9B shows a structural example of a panel manufactured utilizing a method of sealing liquid crystal which differs to that of FIG. 9A. Note that in FIG. 9B, portions which are the same as those in FIG. 9A are denoted by the same reference numerals as those used in FIG. 9A. In the display panel shown in FIG. 9B, liquid crystal is injected through an inlet for injecting liquid crystal which is formed by a first sealant 1925, using a liquid crystal injecting method or the like, and then the inlet for injecting liquid crystal is sealed by a second sealant 1926.

Figures 9C, 9D:
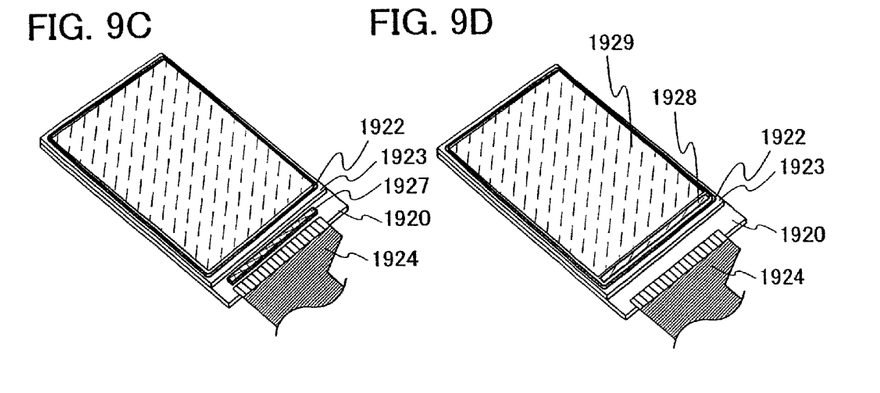

FIG. 9C shows a structural example of a panel which differs from that of FIG. 9A. Note that in FIG. 9C, portions which are the same as those in FIG. 9A are denoted by the same reference numerals as those used in FIG. 9A. In the display panel shown in FIG. 9C, a driver IC 1927 for driving the display panel is mounted over the first substrate 1920. The driver IC 1927 is mounted over the first substrate 1920 so that integration of a circuit is achieved.

FIG. 9D shows a structural example of a panel which differs from that of FIG. 9A. Note that in FIG. 9D, portions which are the same as those in FIG. 9A are denoted by the same reference numerals as those used in FIG. 9A. In the panel shown in FIG. 9D, a display portion 1929 and a driver circuit 1928 for driving the display portion 1929 are formed over one substrate, the first substrate 1920. As the driver circuit 1928, amorphous silicon TFTs, polysilicon TFTs, and the like can be used. Further, another circuit (such as an optical sensor circuit or a CPU) may be provided over the same substrate as the driver circuit.

In the display panels shown in FIGS. 9A to 9D, a desired optical film such as a polarizing plate, an antireflection film, or a color filter is provided by being stacked. In the present invention, the dummy layer and the columnar spacer described in embodiment modes are provided in positions overlapping with the TFT, so that improvement in definition and aperture ratio in a liquid display device can be realized. As described above, liquid crystal display devices obtained by implementing the present invention may be used as display portions of all kinds of various electronic appliances.

This embodiment can be freely combined with Embodiment Mode 1 or 2 or Embodiment 1 or 2.

This application is based on Japanese Patent Application serial no. 2006-266287 filed in Japan Patent Office on Sep. 29, 2006, the entire contents of which are hereby incorporated by reference.

What is claimed is:

1. A display device comprising:
   a first substrate having an insulating surface;
   a switching element over the first substrate;
   an insulator layer over the switching element;
   a pixel electrode electrically connected to the switching element, over the insulator layer;
   a dummy layer overlapping with the switching element, over the insulator layer; and
   a columnar spacer between the first substrate and a second substrate,
   wherein the pixel electrode and the dummy layer are formed of the same material,
   wherein the switching element comprises a semiconductor layer with at least one channel formation region therein,
   wherein the dummy layer overlaps the at least one channel formation region in the semiconductor layer,
   wherein the dummy layer overlaps the columnar spacer,
   wherein the pixel electrode is formed on and in contact with the insulator layer,
   wherein the columnar spacer is formed on the second substrate,
   wherein the dummy layer is in an electrically floating state, and
   wherein the dummy layer has a pattern shape which is a cross-shape.

2. The display device according to claim 1, further comprising:
   a liquid crystal layer including a liquid crystal material between the first substrate and the second substrate, and
   wherein an operation mode of the liquid crystal layer is either a twist nematic mode or a vertical alignment mode.

3. The display device according to claim 1, wherein the pixel electrode and the dummy layer are transparent conductive films.

4. A display device comprising:
   a first substrate having an insulating surface;
   a switching element over the first substrate;
   a planarizing resin film over the switching element;
   a pixel electrode electrically connected to the switching element, over the planarizing resin film;
   dummy layers overlapping with the switching element, over the planarizing resin film; and
   a columnar spacer between the first substrate and a second substrate,
   wherein the pixel electrode and the dummy layers are formed of the same material,
   wherein the switching element comprises a semiconductor layer with at least one channel formation region therein,
   wherein the dummy layers overlap the at least one channel formation region in the semiconductor layer,
   wherein the dummy layers overlap one of the columnar spacer,
   wherein the pixel electrode is formed on and in contact with the planarizing resin film,
   wherein the columnar spacer is formed on the second substrate,
   wherein the dummy layers are in an electrically floating state, and
   wherein shapes of the dummy layers differ from each other.

5. The display device according to claim 4, further comprising:
   a liquid crystal layer including a liquid crystal material between the first substrate and the second substrate, and
   wherein an operation mode of the liquid crystal layer is either a twist nematic mode or a vertical alignment mode.

6. The display device according to claim 4, wherein the pixel electrode and the dummy layers are transparent conductive films.

7. A display device comprising:
   a first substrate having an insulating surface;
   a switching element over the first substrate;
   a pixel electrode electrically connected to the switching element, over the first substrate;
   dummy layers overlapping with the switching element, over the first substrate; and
   a columnar spacer between the first substrate and a second substrate,
   wherein the pixel electrode and the dummy layers are formed of the same material,
   wherein the switching element comprises a semiconductor layer with at least one channel formation region therein,
   wherein the dummy layers overlap the at least one channel formation region in the semiconductor layer,
   wherein the dummy layers overlap one of the columnar spacer,
   wherein the columnar spacer is formed on the second substrate,
   wherein the dummy layers are in an electrically floating state, and
   wherein shapes of the dummy layers differ from each other.

8. The display device according to claim 7, further comprising:
   a liquid crystal layer including a liquid crystal material between the first substrate and the second substrate, and
   wherein an operation mode of the liquid crystal layer is either a twist nematic mode or a vertical alignment mode.

9. The display device according to claim 7, wherein the pixel electrode and the dummy layers are transparent conductive films.

* * * * *